United States Patent
Wang

(10) Patent No.: US 7,693,403 B2
(45) Date of Patent: Apr. 6, 2010

(54) METHOD OF PERFORMING AUTOMATIC FOCUS AND A RELATED DIGITAL IMAGE CAPTURING DEVICE

(75) Inventor: Chun-Chang Wang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 324 days.

(21) Appl. No.: 11/691,175

(22) Filed: Mar. 26, 2007

(65) Prior Publication Data

US 2008/0124063 A1    May 29, 2008

(30) Foreign Application Priority Data

Nov. 24, 2006    (TW) .............................. 095143648 A

(51) Int. Cl.
*G03B 17/00* (2006.01)

(52) U.S. Cl. .......................................... 396/48; 396/79

(58) Field of Classification Search .................. 396/48, 396/77, 79; 348/345
See application file for complete search history.

(56) References Cited

U.S. PATENT DOCUMENTS

| 5,333,030 | A  | * | 7/1994 | Kikukawa et al. | ............ 396/303 |
| 5,404,013 | A  | * | 4/1995 | Tajima | ........................ 250/332 |
| 7,265,397 | B1 | * | 9/2007 | Tower et al. | ................. 257/223 |

* cited by examiner

*Primary Examiner*—Rodney E Fuller
(74) *Attorney, Agent, or Firm*—Alan Kamrath; Kamrath & Associates PA

(57) ABSTRACT

A method of performing an automatic focusing procedure is used with a digital image capturing device. The method includes the steps of: executing an image capturing procedure; activating a pre-control signal by a processor; activating a control signal by a timing generator; executing an automatic focusing procedure; clearing the pre-control signal and the control signal immediately after the automatic focusing procedure is executed; and executing an exposure procedure.

8 Claims, 3 Drawing Sheets

METHOD OF PERFORMING AUTOMATIC FOCUS AND A RELATED DIGITAL IMAGE CAPTURING DEVICE

BACKGROUND OF THE INVENTION

1. Field of the Invention

The present invention relates to an automatic focusing procedure and, more particularly, to a fast automatic focusing procedure.

2. Description of the Related Art

In today's technology, digital image capturing devices are extremely popular devices, and users are demanding increasingly better performance from digital image capturing devices. In general, when the user uses the digital image capturing device to take a picture, an automatic focusing procedure is typically first performed. However, in the prior art technology, the automatic focusing procedure requires a predetermined time period for the focusing motor in the digital image capturing device to operate before taking the picture. The digital image capturing device must store the predetermined operational time parameter of the focusing motor in advance, and this recorded operational time parameter is a fixed value that cannot be changed. Additionally, a buffer period may be added to the predetermined time period to account for delays caused by the mechanism or software. As a result, the entire operating time of the digital image capturing device may be relatively long, and the recorded operations-related data occupies memory.

Therefore, it is desirable to provide a method for performing automatic focusing and a related digital image capturing device to mitigate and/or obviate the aforementioned problems.

SUMMARY OF THE INVENTION

A main objective of the present invention is to provide a fast automatic focusing procedure for a digital image capturing device.

In order to achieve the above-mentioned objective, the digital image capturing device comprises a processor, a timing generator, a digital image capturing module and a focusing motor. The processor is used for processing the various procedures of the digital image capturing device. The digital image capturing module comprises a plurality of photo diodes for performing an exposure procedure. The timing generator is used for controlling an image capturing procedure of the digital image capturing module. The focusing motor is used for adjusting the focal depth of the digital image capturing device during image capturing.

The automatic focusing procedure of the present invention comprises activating a pre-control signal by the processor of the digital image capturing device to control the procedure executed by the timing generator. The timing generator checks whether the pre-control signal has been activated. If the pre-control signal is activated, the timing generator activates a control signal immediately. The timing generator performs a dynamic adjusting procedure with the digital image capturing device module, which means the digital image capturing module is then in a non-exposure state.

The processor simultaneously controls the focusing motor to perform the automatic focusing procedure. The processor continuously checks to determine if the focusing motor has moved to a desired position. When the focusing motor is at the desired position, the processor immediately clears the pre-control signal and the control signal. When the pre-control signal and the control signal are cleared, the timing generator stops the dynamic adjusting procedure of the digital image capturing module for a subsequent exposure procedure and image capturing procedure.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
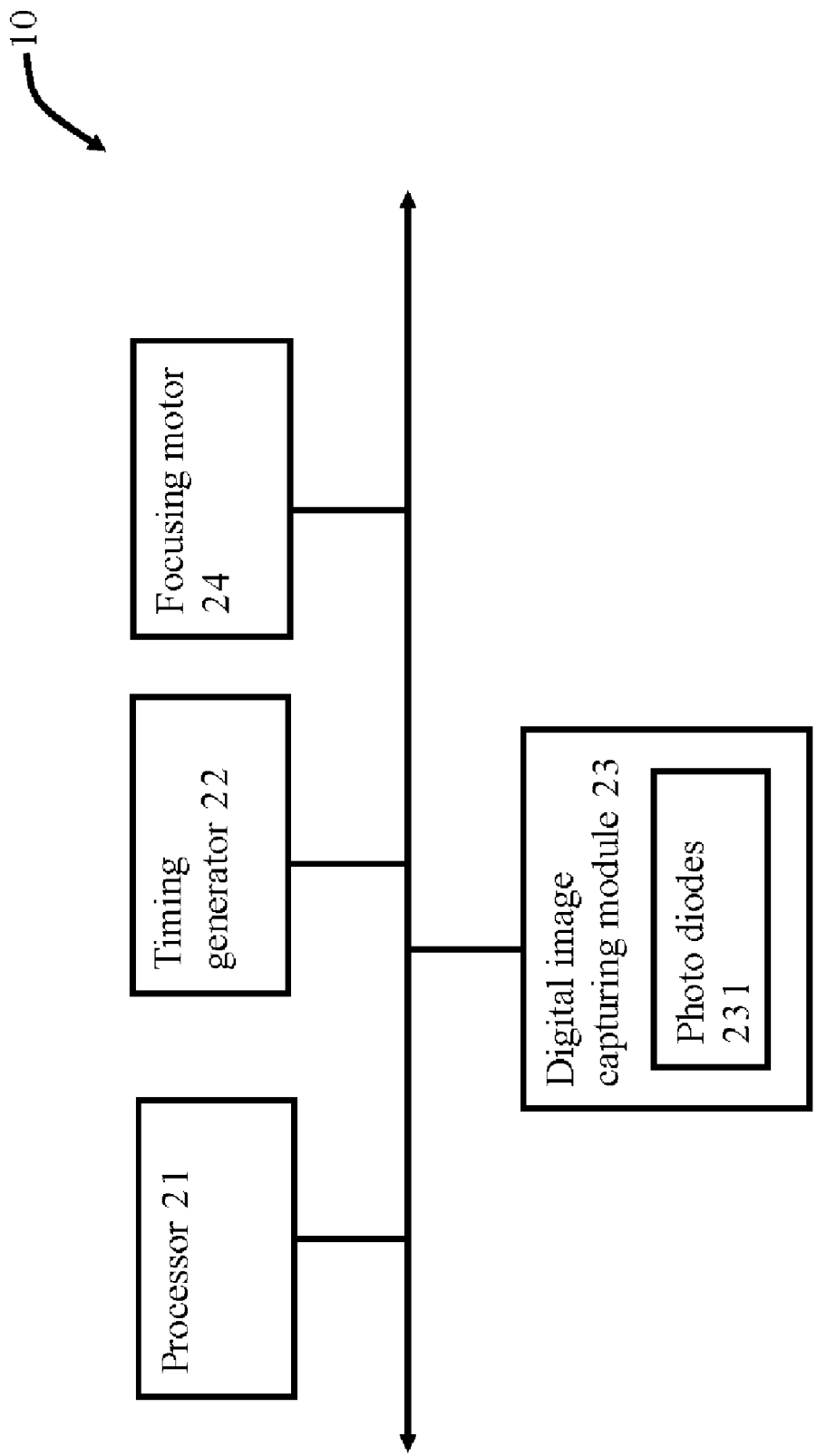
FIG. 1 is a hardware structural drawing of a digital image capturing device according to the present invention.
Figure 3:
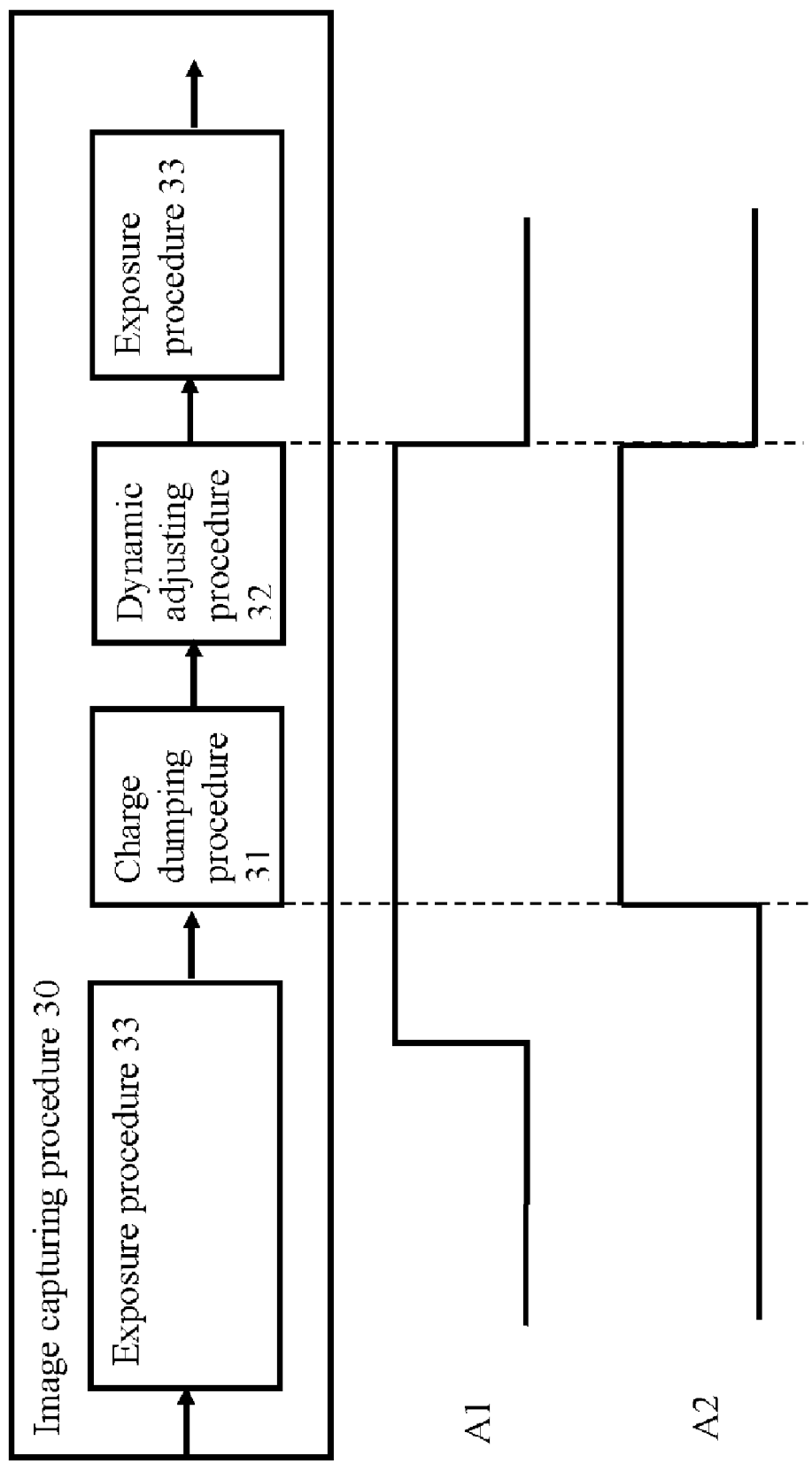
FIG. 3 illustrates the digital image capturing device controlling an image capturing procedure according to the present invention.

Please refer to FIG. 1, FIG. 1 is a hardware structural drawing of a digital image capturing device according to the present invention. The digital image capturing device 10 may be a digital camera, a digital video camera or another equivalent device. The digital image capturing device 10 comprises a processor 21, a timing generator 22, a digital image capturing module 23 and a focusing motor 24. All elements are electrically connected to each other. The processor 21 is used for processing the various procedures of the digital image capturing device 10. The digital image capturing module 23 may include CCD elements or CMOS elements for capturing images. In this embodiment, CCD elements are utilized. The digital image capturing module 23 comprises a plurality of photo diodes 231 for performing an exposure procedure. The timing generator 22 is used for controlling an image capturing procedure 30 of the digital image capturing module 23 (as shown in FIG. 3). In general, the image capturing procedure 30 of the digital image capturing module 23 comprises a charge dumping procedure 31, a dynamic adjusting procedure 32 and an exposure procedure 33, with each procedure controlled by the timing generator 22. The focusing motor 24 is used for adjusting the focal depth of the digital image capturing device 10 during image capturing.

Figure 2:
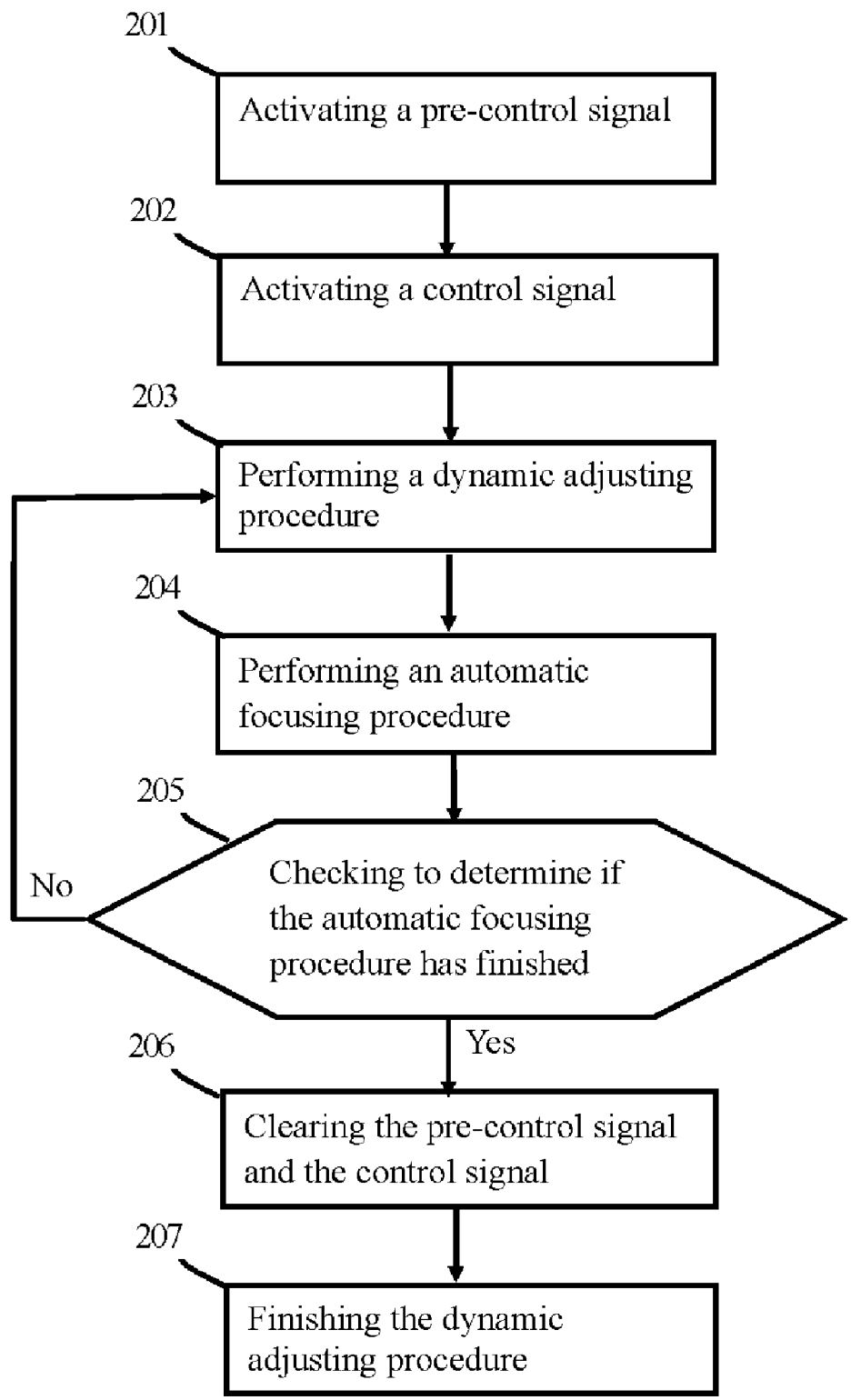
FIG. 2 is a flow chart for an automatic focusing procedure performed by the digital image capturing device according to the present invention.

Please refer to FIG. 2 and FIG. 3. FIG. 2 is a flow chart for an automatic focusing procedure performed by the digital image capturing device 10 according to the present invention. FIG. 3 is a scheme drawing of the digital image capturing device 10 controlling an image capturing procedure 30 according to the present invention.

Prior to the digital image capturing device 10 performing the automatic focusing procedure 204, step 201 is executed: activating a pre-control signal A1.

The processor 21 of the digital image capturing device 10 activates the pre-control signal A1 to control the procedure executed by the timing generator 22, which may be an exposure procedure 33 of the image capturing procedure 30.

Next, in step 202, a control signal A2 is activated.

At the beginning of each charge dumping procedure 31 performed during the image capturing procedure, the timing generator 22 checks whether the pre-control signal A1 has been activated. If the pre-control signal A1 is activated, the timing generator 22 activates the control signal A2 to control the actions of the digital image capturing module 23 and during the image capturing procedure 30.

In step 203 a dynamic adjusting procedure 32 is performed.

The digital image capturing module 23 must refresh the exposed photo diodes 231, which is the charge dumping procedure 31. After the charge dumping process, the timing generator 22 performs a dynamic adjusting procedure 32 with the digital image capturing module 23, which means the digital image capturing module 23 is then in a non-exposure state. The dynamic adjusting procedure 32 continuously refreshes the exposed photo diodes 231 to prepare for a subsequent exposure procedure 33 with the digital image capturing module 23.

During the dynamic adjusting procedure 32, step 204 is also simultaneously executed: performing an automatic focusing process.

While the digital image capturing module 23 is performing the dynamic adjusting procedure 32, the processor 21 simultaneously controls the focusing motor 24 to perform the automatic focusing procedure.

Step 205 includes checking to determine if the automatic focusing procedure has finished.

The processor 21 continuously checks to determine if the focusing motor 24 has moved to a desired position. If it is not at the desired position, step 203 is repeated. If the focusing motor 24 has reached the desired position, then the automatic focusing procedure is finished and processes step 206 immediately.

Next, in step 206, the pre-control signal A1 and the control signal A2 are cleared.

When the focusing motor 24 is at the desired position, the processor 21 immediately clears the pre-control signal A1 and the control signal A2.

In step 207, the dynamic adjusting procedure 32 finishes.

When the pre-control signal A1 and the control signal A2 are cleared, the timing generator 22 stops the dynamic adjusting procedure 32 of the digital image capturing module 23. Also, the digital image capturing module 23 begins the exposure procedure 33.

The image capturing speed of the digital image capturing device 10 is thus improved, and there is no need to adjust the operation time for the focusing motor 24.

Although the present invention has been explained in relation to its preferred embodiment, it is to be understood that many other possible modifications and variations can be made without departing from the spirit and scope of the invention as hereinafter claimed.

What is claimed is:

1. A method of performing an automatic focusing procedure for a digital image capturing device, the method comprising:
    activating a pre-control signal with a processor;
    activating a control signal with a timing generator;
    executing an image capturing procedure according to the control signal, wherein executing the image capturing procedure comprises executing a charge dumping procedure for refreshing exposed photo diodes of the digital image capturing device and executing a dynamic adjusting procedure for continuously refreshing the exposed photo diodes of the digital image capturing device;
    executing an automatic focusing procedure; and
    clearing the pre-control signal and the control signal with the processor after the automatic focusing procedure has executed.

2. The method as claimed in claim 1 further comprising checking to determine if the pre-control signal has been activated by the timing generator.

3. The method as claimed in claim 1, wherein executing the image capturing procedure further comprises executing an exposure procedure.

4. The method as claimed in claim 1 further comprising utilizing a focusing motor to perform the automatic focusing procedure.

5. A digital image capturing device with an automatic focusing capability, the digital image capturing device comprising:
    a processor;
    a digital image capturing module having a plurality of photo diodes electrically connected to the processor;
    a timing generator electrically connected to the digital image capturing module for controlling the digital image capturing module to execute an image capturing procedure; and
    a focusing motor electrically connected to the processor, wherein the processor controls the timing generator and the focusing motor to achieve the following means:
        executing an exposure procedure for exposing the photo diodes to become exposed photo diodes;
        activating a pre-control signal by the processor;
        activating a control signal by the timing generator;
        executing an image capturing procedure according to the control signal, wherein the image capturing procedure comprises a charge dump procedure for refreshing the exposed photo diodes and a dynamic adjusting procedure for continuously refreshing the exposed diodes;
        executing automatic focusing procedure; and
        clearing the pre-control signal and the control signal with the processor after the automatic focusing procedure is executed.

6. The digital image capturing device as claimed in claim 5, wherein the image capturing procedure comprises the exposure procedure.

7. The digital image capturing device as claimed in claim 5, wherein the timing generator is also used to determine if the pre-control signal is activated.

8. The digital image capturing device as claimed in claim 5, wherein the digital image capturing device is a digital camera or a digital video camera.

* * * * *